United States Patent [19]
Balz et al.

[11] 3,808,744
[45] May 7, 1974

[54] METHOD AND APPARATUS FOR MANUFACTURE OF SOLID ABRASIVE CHIPS

[75] Inventors: Gunther W. Balz, Kalamazoo; Forrest P. Leipold, Portage, both of Mich.

[73] Assignee: Roto-Finish Company, Kalamazoo, Mich.

[22] Filed: Sept. 13, 1971

[21] Appl. No.: 179,816

[52] U.S. Cl............................ 51/3, 51/163, 51/314
[51] Int. Cl....... B24b 7/00, B24b 9/00, B24b 31/00
[58] Field of Search......................... 51/3, 163, 314

[56] References Cited
UNITED STATES PATENTS

| | | | |
|---|---|---|---|
| 3,324,605 | 6/1967 | Lester | 51/314 |
| 3,606,702 | 9/1971 | Balz | 51/163 |
| 3,073,080 | 1/1963 | Balz | 51/163 |
| 3,073,081 | 1/1963 | Balz | 51/163 |
| 3,073,082 | 1/1963 | Balz | 51/163 |

*Primary Examiner*—James L. Jones, Jr.
*Attorney, Agent, or Firm*—Gordon W. Hueschen

[57] ABSTRACT

Solid abrasive chips are continuously manufactured by providing an endless belt with indentations therein in the form of a desired chip, filling the indentations with a fluid abrasive admixture, contacting the filled indentations with a cooling fluid so as to solidify the admixture, and thereafter removing the solidified chip. A machine for the foregoing manufacture comprises an endless belt with indentations stretched over two rotatable drums one of which is driven, a dispenser means situated above the belt and adapted to fill the indentations with a fluid abrasive admixture, and chilling means adapted to solidify the admixture within the indentations.

4 Claims, 7 Drawing Figures

METHOD AND APPARATUS FOR MANUFACTURE OF SOLID ABRASIVE CHIPS

BACKGROUND OF THE INVENTION

Finishing of workpieces, as for example metal or plastic parts made by matching or casting, is generally accomplished by tumbling or vibrating an admixture of the workpieces and a finishing composition in a chamber so as to impart a macro-orbital motion to the admixture and so as to bring about relative motion between the workpieces and the finishing composition. Finishing machines for this purpose are commercially available and are exemplified by U.S. Pat. Nos. Re 27,084; 3,071,900; 3,073,069; 3,073,078; 3,073,079; 3,073,080; 3,073,081; 3,073,082; and 3,093,940.

The finishing composition generally comprises a mixture of relatively large pellets utilized as a bulking agent together with a finely divided abrasive material, or the composition may comprise relatively large pellets in which the finely divided abrasive material has been dispersed either uniformly throughout or concentrated at the surface, center, or some other area thereof. Such pellets or "chips," as they are commonly termed, may be made in any of many different configurations such as triangles, rings, stars, bars, cylinders, and the like.

In some applications where it is desirable to effect a ready separation of the finishing composition and the workpieces after finishing, it is advantageous to utilize finishing chips where the abrasive material is dispersed within a matrix which melts at relatively low temperatures which temperatures leave the finished parts unaffected. A finishing process of this type is disclosed in U.S. Pat. No. 3,422,580.

Heretofore, chips for use in such a finishing process have been prepared in a batch operation by filling appropriate molds with a fluid abrasive admixture and then solidifying the same by freezing — a relatively slow and cumbersome operation. Attempts have been made also to adapt commercial continuous ice cube machines for finishing chip production but without much success. Accordingly, it is an object of the present invention to provide apparatus and method whereby chips comprised of abrasive particles dispersed in a meltable matrix are produced in large quantities continuously, expeditiously, and economically. Another object of the present invention is to provide a system for finishing workpieces. Still other objects of this invention will readily present themselves upon reference to the ensuing specification, the drawings, and the claims.

SUMMARY OF THE INVENTION

The present invention contemplates a machine having a frame, a pair of substantially horizontal drums, one of which is driven, rotatably mounted on the frame, and an endless belt having indentations in the form of desired chip configuration stretched over said drums. A fluid abrasive admixture dispenser is situated above the belt and is adapted to dispense the admixture into the indentations. A chilling means substantially envelops that portion of the belt carrying the fluid abrasive admixture. As the abrasive admixtures moves through the chilling means, it solidifies. The individual solid chips are dislodged from the belt as it moves around the drum.

A system for finishing workpieces such as metal or plastic objects or parts by means of finishing chips made of finely divided abrasive particles suspended in a solid but meltable matrix, i.e., melting at a relatively low temperature, such as ambient temperature, comprises the combination of an apparatus for manufacturing the finishing chips and having a liquid refrigerant bath as the chilling means; a finishing machine adapted to receive finishing chips from said apparatus and adapted to impart macroorbital motion to an admixture of workpieces and finishing chips placed in said machine; conduit means for circulating refrigerant liquid from said bath through the admixture of workpieces and finishing chips in the finishing machine; and refrigeration means for chilling the circulating refrigerant liquid.

DESCRIPTION OF THE PREFERRED EMBODIMENTS

Figure 1:
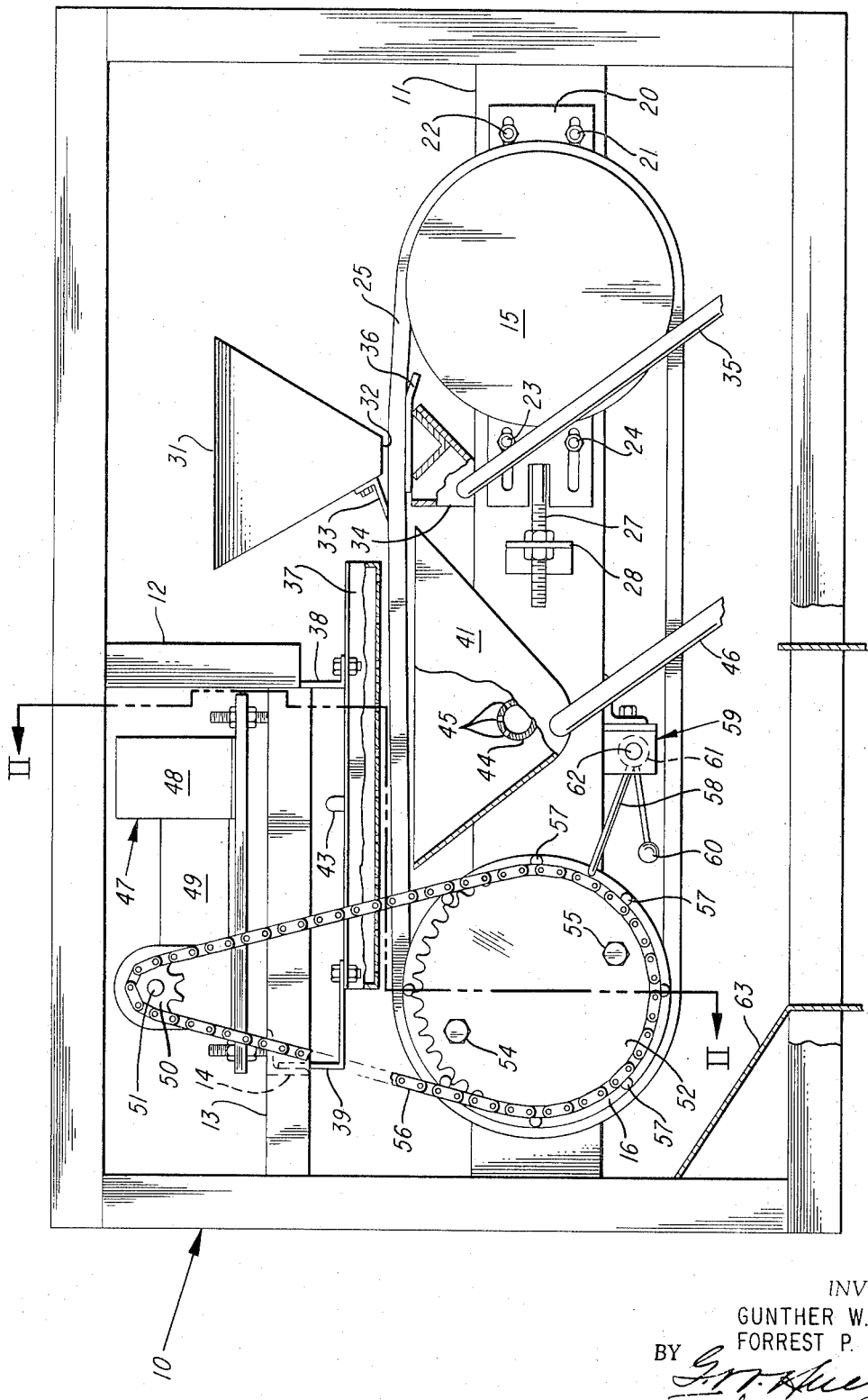
FIG. 1 is a side elevation, partially broken away to show interior detail, of the apparatus of this invention.
Figure 2:
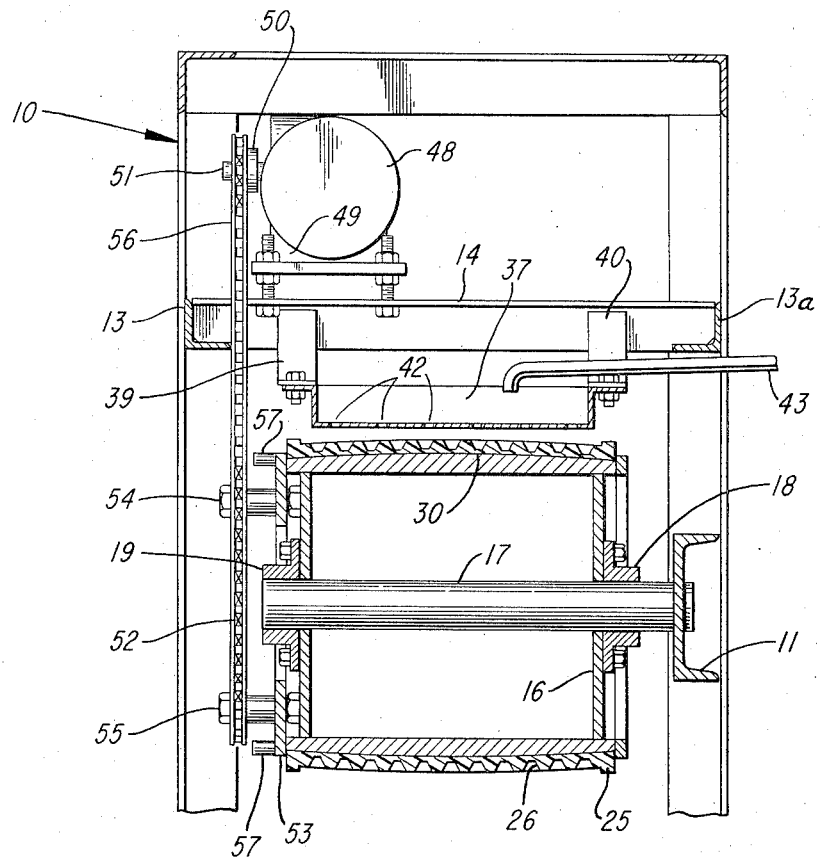
FIG. 2 is a sectional elevation of the apparatus taken along line II — II of FIG. 1.

Referring to FIG. 1, an apparatus of this invention is mounted within frame 10 which is provided with a longitudinal cross-member 11 and auxiliary frame members 12, 13, 13a, and 14, (FIG. 2). Drum 16 is disposed horizontally and is rotatably mounted on cross-member 11 by means of shaft 17 fixed on and projecting forwardly from cross-member 11. Shaft 17 is journaled in bearings 18 and 19 situated at opposite ends of drum 16. In a like manner, drum 15 is positioned with its axis of rotation substantially parallel to that of drum 16 and is rotatably mounted on cross-member 11 by means of a journaled shaft similar to shaft 17 which is affixed to plate 20. Plate 20, in turn, is mounted on cross-member 11 by means of bolts 21, 22, 23 and 24 so as to permit axial adjustment of drum 15 relative to drum 16.

Figure 3:
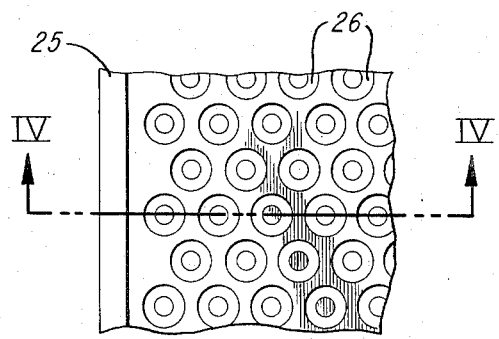
FIG. 3 is a plan view of a fragment of an endless belt utilized within the apparatus.
Figure 4:
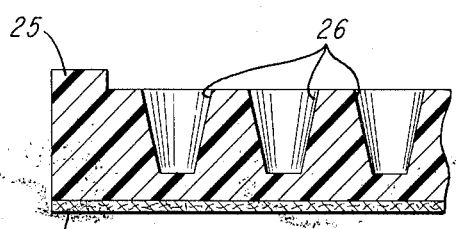
FIG. 4 is a sectional view of the fragment shown in FIG. 3 along line IV — IV.

An endless belt 25, provided with indentations 26 of desired chip form (frusto-conical as shown in FIGS. 3 and 4) is stretched over drums 15 and 16. Belt tension is adjusted by screw means 27 engaging plate 20 and mounted on angle iron 28 which is affixed to cross-member 11. Preferably belt 25 is made of durable flexible material such as polyurethane, silicone rubber, or the like. Optionally, belt 25 is provided with a backing layer of fabric 29 on the inner surface thereof which aids in carrying the driving load imposed on belt 25 when in use.

In order to facilitate dislodging of solidified chips from indentations 26 of belt 25 the lateral surface of at least one of drum 15 and 16 preferably is provided with a slight crown, i.e., is convex as shown in FIG. 2 for lateral surface 30 of drum 16.

Situated above an upper horizontal portion of belt 25 is a dispenser means such as hopper 31 which contains the fluid abrasive admixture to be solidified in chips. The admixture is usually of mud-like consistency and flows readily onto belt 25 as it moves past discharge opening 32 of hopper 31. Trough 34 is mounted on cross-member 11 in any convenient manner and extends forwardly therefrom under the upper portion of belt 25. Any excess fluid and/or abrasive is scraped off by blade 33 affixed to the lower end of hopper 31, flows downwardly into trough 34, and exits therefrom via conduit 35.

Belt guide or support 36 provided on an upper lip of trough 34 elevates belt 25 at that point slightly toward hopper opening 32 and assures that belt 25 and opening 32 are always in relatively close proximity to each other.

Chilling means substantially envelops an upper portion of belt 25 and comprises pan 37 situated above belt 25 and mounted on auxiliary frame members 12, 13 and 14 by brackets 38, 39 and 40, respectively, and hood 41 situated below the upper portion of belt 25. Pan 37 is provided with perforations 42 (FIG. 2) in the bottom portion thereof so as to pass a refrigerant fluid such as chilled mineral spirits, i.e., Stoddard Solvent, therethrough and onto belt 25. Conduit 43 is mounted in any convenient manner above pan 37 and serves to supply chilled refrigerant fluid to pan 37. Similarly, spray header 44 is mounted within hood 41 and provided with openings 45 in the upper portion thereof adapted to spray chilled refrigerant fluid against the underside of the upper portion of belt 25. Spent refrigerant fluid is collected within hood 41 and recycled to a refrigeration unit (not shown) via conduit 46.

Drum 16 is rotated in counter clockwise direction by prime mover 47 which comprises electric motor 48 and speed reducer 49 having a sprocket wheel 50 mounted on output shaft 51. Chain 56 operably engages sprocket wheel 50 and sprocket wheel 52 which is mounted on the front face of drum 16 by bolts 54 and 55. An annular disc 53 (FIG. 2) is interposed between sprocket wheel 52 and drum 16 and is held in place by the same bolts 54 and 55. Evenly-spaced pins 57 project forwardly from annular disc 53 and are adapted to engage rod 58 of hammer means 59 mounted on cross-member 11 near the lower portion of belt 25. Hammer means 59 comprises rod 58 and striker 60 both integrally mounted on sleeve 61 which is journaled on shaft 62. Counterclockwise rotation of drum 16 causes pin 57 to engage, raise, and drop rod 58 and stricker 60 as pin 57 travels an arcuate upward path.

The fluid abrasive admixture comprises finely divided abrasive grains such as aluminum oxide, silicon dioxide, silicon carbide, and the like, mixed with a sufficient amount of solidifiable liquid vehicle, usually water, to fill the interstices, resulting in a mass of mud-like consistency.

Any refrigerant fluid that is compatible with the machine components and which can be maintained fluid at temperatures sufficiently low to solidify the abrasive admixture can be employed. If the liquid vehicle is molten wax, for example, chilled water is a suitable refrigerant fluid. If the liquid vehicle is water, on the other hand, the usual operating temperature range for finishing chip manufacture is from about $-20°$ F to about $-10°$ F. and a refrigerant liquid such as mineral spirits (Stoddard Solvent) is preferred. Also suitable are 1,1,1-trichloroethane or a petroleum base material such as naphtha having a relatively high flash point. An added benefit is derived from mineral spirits or a petroleum base material in that these refrigerant fluids also have lubricating properties and can function as lubricants for the moving machine parts. Moreover, further advantages also accrue in the ultimate finishing application of the manufactured chips inasmuch as the chips are coated with the fluid and thus perform a degreasing and cleaning function as parts are finished. The refrigerant fluid can also be in a gaseous or vapor form when contacting the belt which carries the abrasive admixture to be solidified. For example, cold vapors from liquid nitrogen can be directed against the belt. Similarly, a blast of dry cold air may be sufficient to bring about the desired solidification of the fluid abrasive admixture deposited on the belt.

In operating the machine of this invention shown in FIGS. 1 and 2, fluid abrasive mixture is fed into hopper 31 from whence it is continuously deposited in indentations 26 of moving belt 25 which is driven by counter clockwise rotating drum 16. Any excess of the admixture is scraped off by blade 33 and falls into trough 34. The admixture contained in indentations 26 then passes into the chilling means where the refrigerant fluid drips directly on belt 25, and on the admixture aliquots carried thereon in indentations 26, through perforations 42 in pan 37. Belt 25 is also cooled from the underside thereof by a spray of refrigerant fluid emanating from spray header 44 through openings 45.

As the admixture passes through the chilling means it solidifies, and the resulting solid abrasive chips are dislodged from indentations 26 as that portion of belt 25 rounds drum 16. Any chips that stick on belt 25 are dislodged by the action of hammer means 59. The dislodged chips are collected in a suitable refrigerated or insulated container which can be placed underneath drum 16. Alternatively, suitable guide means such as baffle 63 can be provided which directs the solid chips to a desired collection point.

Figure 5:
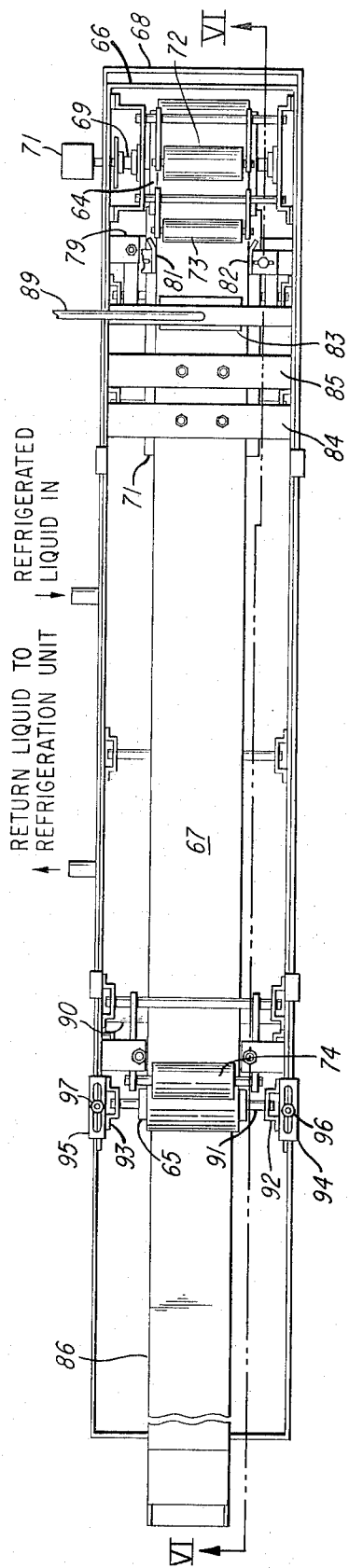
FIG. 5 is a plan view of another apparatus embodying the present invention.
Figure 6:
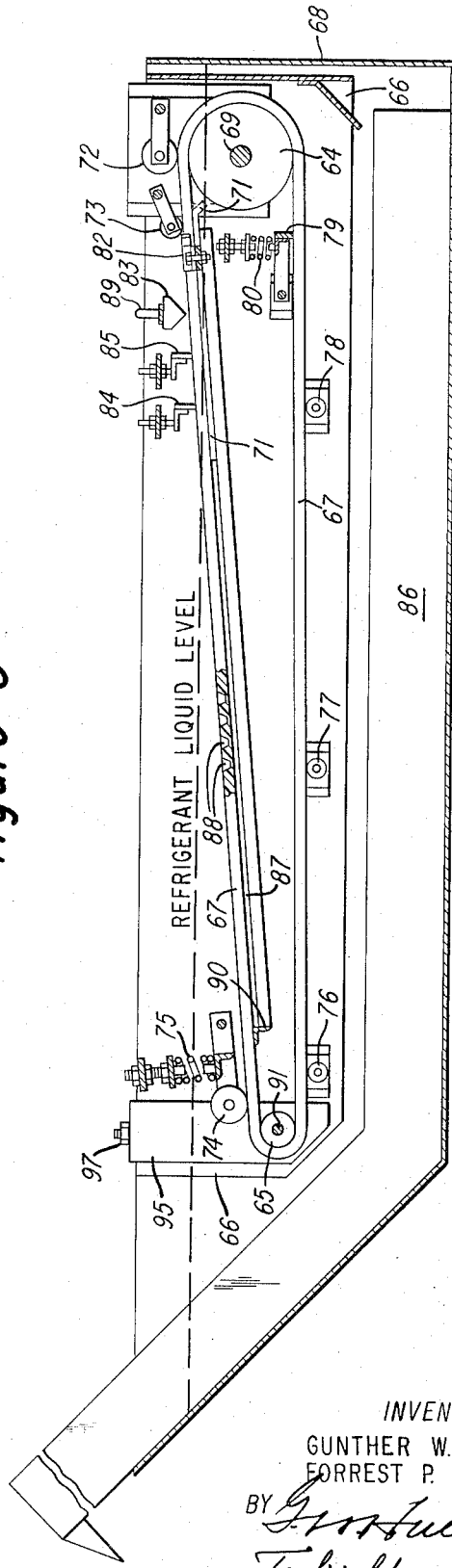
FIG. 6 is an elevational view, partly in section, of the apparatus shown in FIG. 5 taken along line VI — VI.

Another preferred embodiment of the abrasive chip manufacturing apparatus of this invention is shown in FIGS. 5 and 6. Rotatable drums 64 and 65 are mounted on box frame 66 and endless belt 67, provided with indentations 88 similar to those shown in FIGS. 3 and 4, is stretched over drums 64 and 65. Drum 64 is adapted to drive belt 67 and drum 65 serves as an idler.

Box frame 66 is mounted within insulated tank 68 adapted to contain a liquid bath of a suitable refrigerant liquid which can be maintained at a temperature below the solidification temperature of the fluid abrasive admixture within tank 68 by means of appropriate cooling coils or which can be recirculated between the tank and an external refrigerating unit (not shown). Refrigerant liquid within tank 68 is maintained at a level sufficient to cover at least a part of the upper portion of belt 67. Preferably a major part of the upper portion of belt 67 is submerged in the refrigerant liquid.

As shown in FIGS. 5 and 6, idler drum 65 is of a relatively smaller diameter than driver drum 64 and is mounted so as to impart a downward slope to the upper portion of belt 67, thereby facilitating submersion of part of the upper portion of belt 67 in the refrigerant liquid. Such an arrangement, albeit preferred when fluid abrasive admixture is deposited on the belt above the liquid level in tank 68, is not essential because the fluid abrasive mixture can be deposited also on a submerged belt as long as the specific gravity of the admixture is greater than that of the refrigerant liquid as will be further discussed hereinbelow. In such an event the entire belt can be submerged and the upper portion of the belt can be horizontal, if desired.

Preferably the lateral surface of idler drum 65 is convex so as to facilitate dislodging of solidified chips from indentations 88 as belt 67 rounds drum 65. A convex lateral surface is also preferred on driver drum 64 to enhance the tracking properties of belt 67.

Tension of belt 67 is adjusted by lateral movement of idler drum 65 which is rotatably mounted on shaft 91 journaled in bearings 92 and 93 affixed to movable plates 94 and 95, respectively. Plates 94 and 95 are slidably supported on frame 66 and are secured in a desired position by means of nuts 96 and 97, respectively.

Drum 64 is driven by variable drive means 70 connected to drum 64 through shaft 69 or in any other convenient manner, for example by a chain and sprocket arrangement. Variable drive means 70 can be an electric motor or a similar prime mover.

Upper portion of belt 67 is supported between drums 64 and 65 by belt support platform 71, and optionally by a plurality of support strips 87 which are fastened at one end to platform 71 and at the other end to transverse member 90 secured across box frame 66. Belt guides 81 and 82 are mounted on each side of support platform 71 and can be adjustable or fixed, as desired.

Pinch roller 72 is pivotally mounted on frame 66 and rides on top of belt 67 immediately above drum 64. As belt 67 rises above the level of liquid in tank 68, belt 67 is relatively cold and stiff, and thus tends to disengage from drum 64. Pinch roller 72 assists belt 67 in maintaining contact with the lateral surface of drum 64. Belt flattening roller 73 is also pivotally mounted on frame 66 and presses belt 67 against support platform 71. Tensioning roller 74 is pivotally mounted on frame 66 near drum 65 and is biased against the upper portion of belt 67 between drum 65 and support strips 87 by coil spring 75. Rollers 76, 77 and 78, suitably mounted on frame 66, serve to support the lower portion of belt 67 between drums 64 and 65. Scraper means 79, pivotally mounted on frame 66, is biased by coil spring 80 against the inner surface of belt 67 just before this surface is engaged by drum 64 and serves to keep this surface clean from any foreign matter that may be deposited thereon as a result of an occasional overflow of material which is deposited on the upper portion of belt 67.

Dispenser station 83 situated above belt 67 deposits fluid abrasive admixture in indentations 88. while in the arrangement shown in FIGS. 5 and 6 dispenser station 83 is situated so that the admixture is deposited on an exposed, i.e., unsubmerged, portion of belt 67, this is not essential for purposes of the present invention. The admixture can be deposited on a submerged portion of the belt as well, provided the specific gravity of the refrigerant liquid employed is less than that of the admixture.

Wiper blades 84 and 85 extending transversely across belt 67 are provided downstream from dispenser station 83 and assure complete fill of indentations 88 with the fluid abrasive admixture. Also, any excess of the admixture is wiped off belt 67 by blades 84 and 85. The use of two wiper blades is preferred; however, one wiper blade is adequate.

Drag conveyor 86 is situated at the bottom of tank 68 and is adapted to collect solidified abrasive chips falling out of indentations 88 as these indentations round drum 65, and to carry the collected abrasive chips out of tank 68.

During operation of the apparatus shown in FIGS. 5 and 6, fluid abrasive admixture is metered through conduit 89 to dispenser station 83 and distributed therefrom onto belt 67 which moves in a counterclockwise direction in the view shown in FIG. 6. Belt 67 passes under wiper blades 84 and 85 which assure that indentations 88 are completely and uniformly filled and that any excess of the fluid admixture is wiped off belt 67 before solidification. As belt 67 travels in a counterclockwise direction, that portion thereof carrying the fluid abrasive admixture in indentations 88 is submerged in the refrigerant liquid whereupon the admixture is chilled and eventually solidifies with the resulting abrasive chips assuming the shape of the indentations. Travel speed of belt 67 is selected so that the fluid abrasive admixture contained in indentations 88 is completely solidified by the time that particular portion of the belt reaches drum 65. As pointed out hereinabove in connection with drums 15 and 16 of the apparatus shown in FIGS. 1 and 2, the lateral surfaces of drums employed in the apparatus of this invention preferably are provided with a slight crown which facilitates the removal of solidified chips from the belt. Thus, in the particular embodiment shown in FIGS. 5 and 6, the lateral surface of drum 65 is slightly crowned, and as indentations 88 round drum 65, the solidified abrasive chips contained therein are readily dislodged and fall to the bottom of tank 68. Drag conveyor 86 or similar gathering means then collects the chips from the tank bottom and transports the chips to a desired collection point or place of utilization. For example, in a workpiece finishing system the present apparatus can be situated next to a vibratory finishing machine and conveyor 86 can be arranged so that the abrasive chips are deposited directly into the vibrating bowl of a finishing machine as soon as manufactured.

Figure 7:
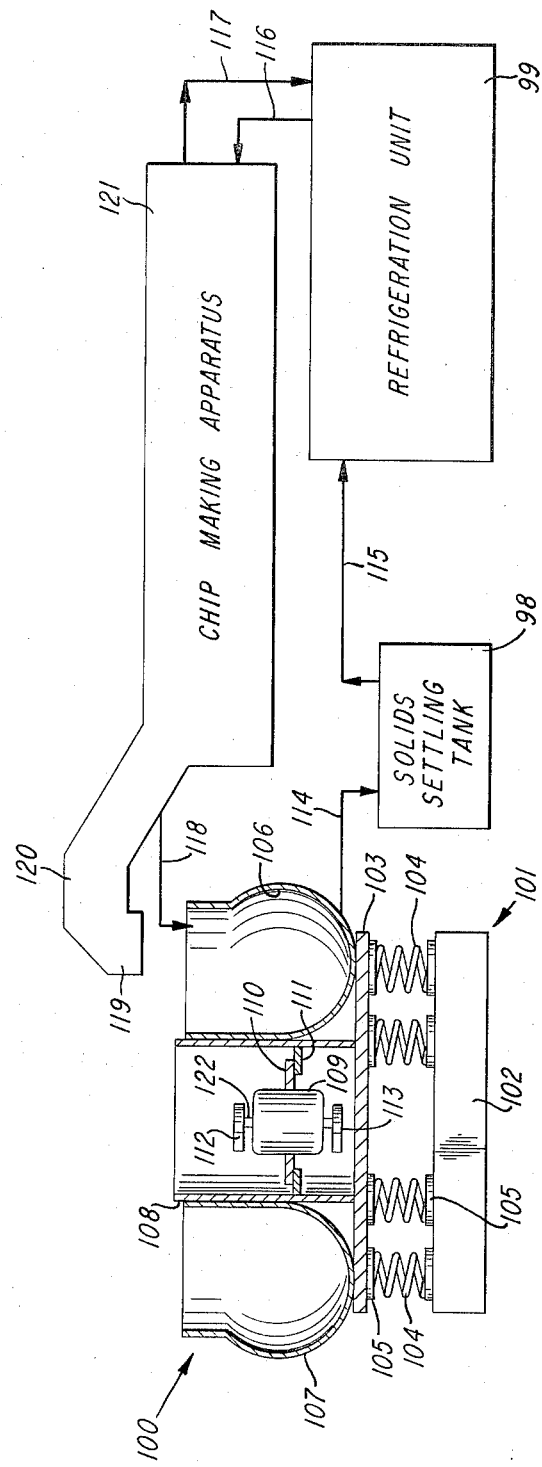
FIG. 7 is a diagrammatic view of a finishing system of the present invention.

A workpiece finishing system of the present invention is shown in FIG. 7. The system comprises chip-making apparatus 121, vibratory finishing machine 100 adapted to receive finishing chips therefrom, and refrigeration unit 99. A common liquid refrigerant is circulated through the system by means of refrigerant lines 114, 115, 116, 117 and 118. Optionally solids settling tank 98 can be provided between finishing machine 100 and refrigeration unit 99 so as to remove from the circulating liquid refrigerant any suspended abrasive particles and sludge generated during finishing and/or as a result of the normal depreciation of the finishing chips during use.

Support 101 for vibratory finishing machine 100 comprises stationary base plate 102 and upper base plate 103 spring-mounted on stationary base plate 102 by means of helical springs 104 affixed to stationary base plate 102 and to upper base plate 103 by means of small plates or cups 105 suitably secured to base plates 102 and 103. Substantially toroidal finishing chamber 106 is mounted on upper base plate 103 in a substantially horizontal position. Mounted on upper base plate 103 and within trough 107 is cylindrical supporting frame 108 for vibratory motor 109 which is secured to frame 108 by means of mounting plate 110 affixed to the housing of motor 109 and by means of brackets 111 affixed to frame 108 at one end of the bracket and to mounting plate 110 at the other end of the bracket. Eccentric weights 112 and 113 are mounted at each end of the drive shaft 122 of motor 109. Rotation of eccentric weights 112 and 113 imparts vibrations to trough 107 and causes an admixture of workpieces and chips contained within finishing chamber 106 to travel in a macro-orbital path.

Finishing chips, for example finely divided silicone dioxide suspended in an ice matrix, are received in finishing chamber 106 from chip-making apparatus 121 through chute 119 of drag conveyor 120. During a finishing process, chilled liquid refrigerant such as Stoddard Solvent is withdrawn from the liquid bath of chip-making apparatus 121 and pumped into finishing chamber 106 through refrigerant line 118. The liquid refrigerant circulates through the macroorbiting admixture of chips and workpieces in finishing chamber 106 and exits therefrom through a suitable drain means (not shown) and via line 114 to settling tank 98. Liquid refrigerant from settling tank 98 is pumped to refrigeration unit 99 via line 115 where the refrigerant is chilled and then returned to chip-making apparatus 121 through line 116. Inasmuch as the heat removal duty in chip-making apparatus 121 is usually much greater than in finishing chamber 106, liquid refrigerant preferably is continuously recirculated between chip-making apparatus 121 and refrigeration unit 99 through lines 116 and 117. One or more finishing machines may be supplied with finishing chips and circulating liquid refrigerant from chip-making apparatus 121, depending on the capacity of the finishing machines relative to the chip-making capacity of the apparatus.

The foregoing specification and the drawings are illustrative but are not to be construed as limiting. Still other variations and rearrangements of parts within the spirit and scope of this invention are possible and will readily present themselves to one skilled in the art.

We claim:

1. A system for finishing a workpiece by means of relative motion between the workpiece and finishing chips made of finely divided abrasive particles suspended in a solid but meltable matrix comprising, in combination, an apparatus for manufacturing the finishing chips and having a liquid refrigerant bath as a chilling means for the chips during manufacture;

a finishing machine adapted to receive finishing chips from said apparatus and adapted to impart macro-orbital motion to an admixture of said finishing chips and at least one workpiece placed in said machine;

conduit means communicating between said liquid refrigerant bath and said finishing machine for circulating liquid refrigerant from said bath through the admixture; and refrigeration means adapted to chill the circulating liquid refrigerant.

2. The system of claim 1 where the matrix is ice.

3. The system of claim 1 wherein the liquid refrigerant is mineral spirits.

4. The system of claim 1 wherein the finishing machine is a vibratory finishing machine.

* * * * *